United States Patent [19]

Malkowski et al.

[11] 4,441,379

[45] Apr. 10, 1984

[54] INTERLOCK DEVICE FOR A TRANSMISSION SHIFT MECHANISM

[75] Inventors: Joseph L. Malkowski, Troy; Calvin G. Wells, Warren, both of Mich.

[73] Assignee: Rockwell International Corporation, Pittsburgh, Pa.

[21] Appl. No.: 165,612

[22] Filed: Jul. 3, 1980

[51] Int. Cl.³ .................... G05G 5/10; B60K 17/34
[52] U.S. Cl. .................................. 74/477; 74/745; 180/247
[58] Field of Search .................. 74/475, 477, 745; 180/247

[56] References Cited

U.S. PATENT DOCUMENTS 2,637,221  5/1953  Backus et al. ................. 74/477
2,654,268 10/1953  Perkins ......................... 74/477 X
2,738,690  3/1956  Perkins ......................... 74/745
3,049,929  8/1962  Wagner ......................... 74/477 X Primary Examiner—Allan D. Herrmann

[57] ABSTRACT

An interlock device for a shift mechanism of a multi-speed power transmission device includes a shift rod capable of selective axial positioning at a plurality of predetermined locations for specific gear ratio operating conditions and a neutral non-operating condition. The shift rod includes detents in the surface thereof associated with these locations and a position locating device is aligned with the shift rod to be capable of being forced into engaging contact with one of these detents by the introduction of pressurized air into a power cylinder acting thereon. Selective axial positioning of the shift rod is prevented when the torque transmitting power source providing the input to the transmission device is in a power mode and causes the pressurized air to be applied to the power cylinder.

5 Claims, 5 Drawing Figures

INTERLOCK DEVICE FOR A TRANSMISSION SHIFT MECHANISM

BACKGROUND OF THE INVENTION

1. Field of the Invention

This invention relates to an interlock device for a shift mechanism of a multi-speed power transmission device and, more specifically, to such an interlock device which will prevent shifting of the transmission when the torque transmitting power souce to the transmission device is in a power mode.

2. Description of the Prior Art

There are a number of multi-drive vehicles which utilize a main transmission and a transfer case which is capable of providing power to the rear axle alone or to both the front and rear axles at the same time. Typical transfer cases of this type are disclosed in U.S. Pat. Nos. 3,095,785; 3,557,634 and 3,679,016.

It is not uncommon in transfer cases to include a means for providing a multi-speed power transmission function in the form of ligh and low speed operation. Transfer cases such as those disclosed in U.S. Pat. Nos. 3,941,199 and 4,188,838 include such features and significantly increase the selective operating gear ratios which are available to the operator of a vehicle which uses a main transmission in conjunction with the transfer case.

However, in vehicles of this type, it is of concern that the vehicle should not be operated in a power mode when selecting high or low speed since providing a torque to the transfer case during a shifting operation might result in damage to the high or low speed gearing. Generally, without any protection means being included in the transfer case, the operator is to only shift the gears when the vehicle is at rest and no power is being transmitted to the transfer case.

SUMMARY OF THE INVENTION

It is, therefore, an object of this invention to provide an interlock device for a shift mechanism of a multi-speed power transmission device which will prevent shifting when the torque transmitting power source is in a power mode.

It is another object of this invention to provide such an interlock device which can be operated when the vehicle is in motion and the torque transmitting power source is in a neutral mode.

These and other objects of the invention are provided in a preferred embodiment thereof in the form of an interlock device for a shift mechanism of a multi-speed power transmission device which receives an input from a torque transmitting power source which power source can be selectively operated in a power mode or a neutral mode. The multi-speed power transmission device is capable of operation in specific gear ratio operating conditions or a neutral non-operating condition. The interlock device includes a shift rod which is mounted within a housing of the multi-speed power transmission device and is capable of selective axial positioning therein at a plurality of pre-determined locations each of which is associated with one of the specific gear ratio operating conditions or the neutral non-operating condition. There is included means for preventing the selective axial positioning of the shift rod from one of the predetermined locations to another of the predetermined locations when the torque transmitting power source is being operated in the power mode.

DESCRIPTION OF THE PREFERRED EMBODIMENT

Figure 1:
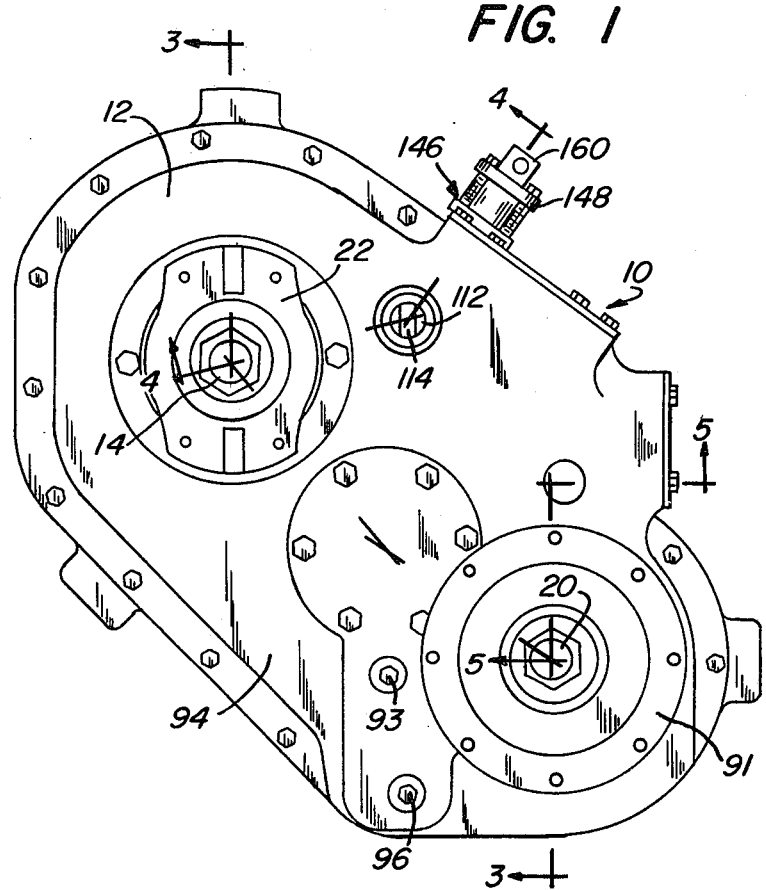
FIG. 1 is a forward elevational view of the preferred transfer case which incorporates various features of the invention.
Figure 2:
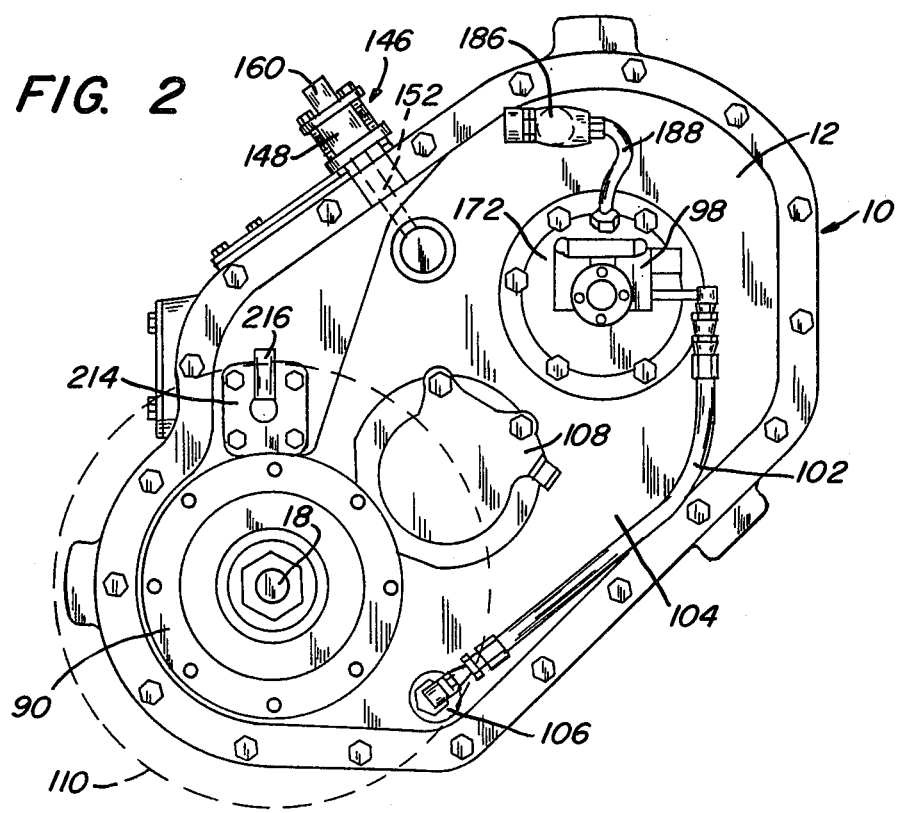
FIG. 2 is a rear elevational view of the preferred transfer case which incorporates various features of the invention.
Figure 3:
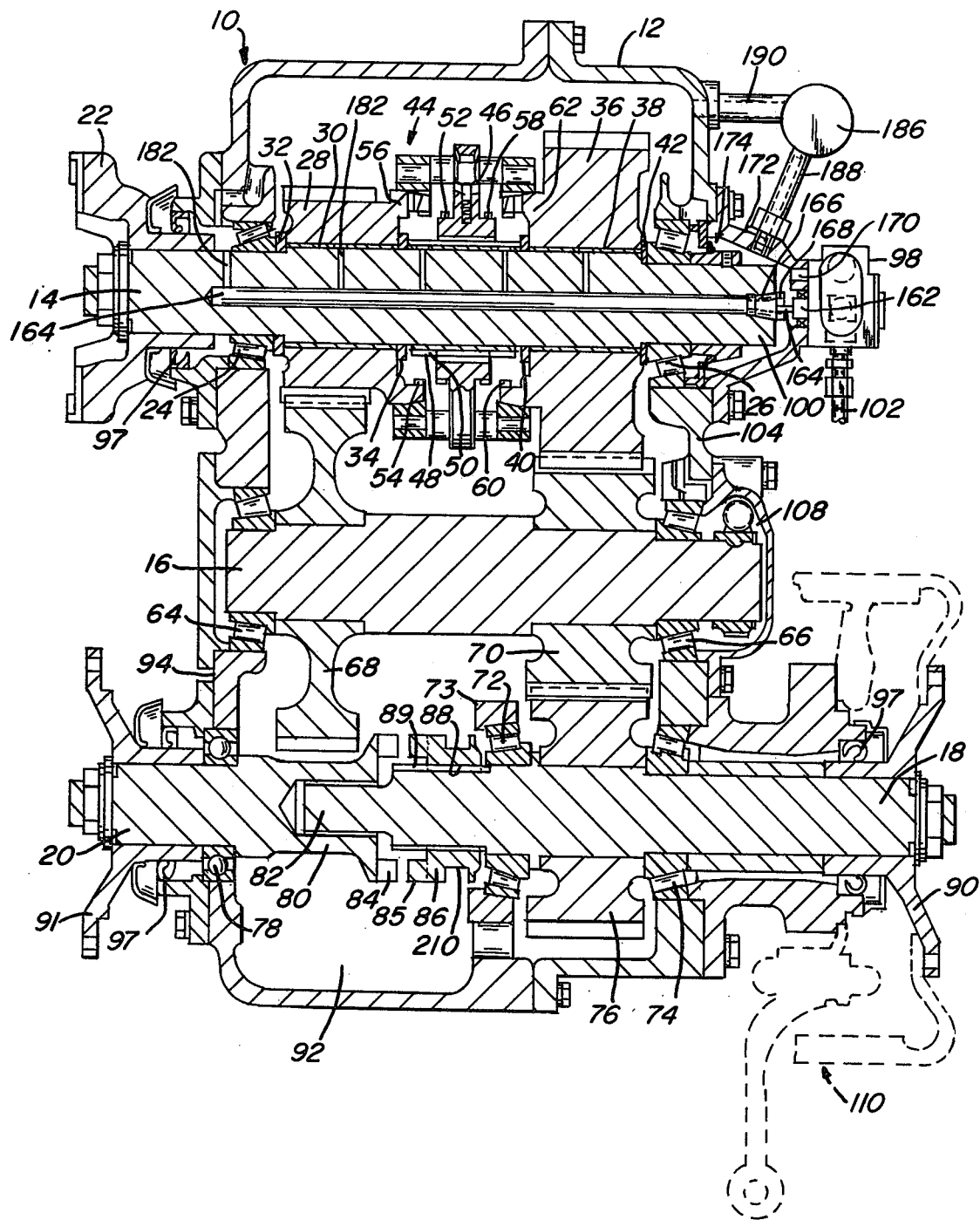
FIG. 3 is a view as seen along line 3—3 of FIG. 1.

As seen in FIGS. 1, 2 and 3 the preferred transfer case 10 includes various features of the invention and is of the type which is intended to be utilized in a road vehicle of the 6×6 type. Basically, the output of a conventional transmission of the road vehicle is provided to the transfer case 10 which in turn includes gearing for selective high or low speed operation to effectively double the number of speed ratious obtainable with the conventional vehicular transmission alone. Additionally, the preferred transfer case 10 includes means for selectively providing a power output to a rear axle configuration alone or for dividing the output between both a forward axle configuration and the rear axle configuration.

Even though the present invention might be employed to improve the operation of other types of secondary transmissions which receive power from a conventional transmission, the present invention has been satisfactorily incorporated in the preferred transfer case 10. A full understanding of all the features of the transfer case 10 are helpful in order to fully understand the present invention.

The basic working elements of the transfer case 10 are generally enclosed within a housing 12 and include an input shaft 14, an idler shaft 16, a rearward output shaft 18 and a forward output shaft 20. An input coupling 22 is rigidly secured to the input shaft 14 and directly receives the output from the vehicle transmission (not shown). The input shaft 14 is mounted for rotation at forward bearings 24 and rear bearings 26. A low speed gear 28 includes a sleeve bearing 30 and is mounted for rotation about the input shaft 14. The spacers 32 and 34 at each side of the low speed gear 28 maintains the gear 28 at an axial position adjacent the bearings 24. Similarly, a high speed gear 36 includes a sleeve bearing 38 for rotation around the other end of the input shaft 14. Spacers 40, 42 are again utilized to retain the high speed gear 36 adjacent the bearings 26 of the input shaft 14.

A shift mechanism 44 is utilized to couple the input shaft 14 to either the low speed gear 28 or the high speed gear 36 as desired. Although the shift mechanism 44 will be discussed in detail hereinbelow, basically it includes an internally toothed annular clutch collar 46 which is slidably mounted on matching extending teeth 48 of an enlarged portion 50 of the input shaft 14 between the low speed gear 28 and the high speed gear 36. To couple the clutch collar 46, and thus the input shaft 14, to the low speed gear 28, the clutch collar must be shifted axially forward toward the low speed gear 28. An array of outwardly extending teeth 52 on the forward end of the clutch collar 46 must be aligned with an in engaging contact with an array of inwardly extending teeth 54 of a rearwardly extending cylindrical projection 56 of the slow speed gear 28. Similarly, to couple the clutch collar 46, and thus the input shaft 14, with the high speed gear 36, the clutch collar 46 must be shifted axially toward the high speed gear 36. Again, an array of outwardly extending teeth 58 at the rearward side of the clutch collar 46 must be aligned with and in engaging contact with an array of inwardly extending teeth 60 on a forwardly extending cylindrical projection 62 of the high speed gear 36. Although, the shift mechanism 44 might be in a neutral position so that neither the low speed gear 28 nor the high speed gear 36 is actually coupled to the input shaft 14, it can be seen that the clutch collar 46 of the shift mechanism 44 is designed to insure that only one of the gears 28, 36 can be coupled to the input shaft 14 at one time.

The idler shaft 16 is utilized to transfer power from either the low speed gear 28 or the high speed gear 36 to the rearward output shaft 18. The idler shaft 16 is mounted for rotation within the housing 12 at forward bearings 64 and rear bearings 66. A low speed idling gear 68 is rigidly secured to the idler shaft 16 at the forwarding end thereof to be in alignment with and in constant engaging contact with the low speed gear 28. Similarly, a high speed idling gear 70 is rigidly mounted to the idler shaft 16 at the rear end thereof in alignment with an in constant engaging contact with the high speed gear 36. Although the gears 28, 68 and the gears 36, 70 will remain respectively engaged throughout operation of the transfer case 10, it can be seen that only one of the gears 28, 36 will be directly coupled to the input shaft 14 to transmit the force which is applied to the idler shaft 16 to cause it to rotate.

The rearward output shaft 18 is mounted for rotation within the housing 12 at forward bearings 72 which are supported by an interior wall 73 of the housing 12 and rearward bearings 74. An output gear 76 is rigidly secured to the output shaft 18 between the bearings 27, 74 to be aligned with and in constant engaging contact with the high speed idling gear 70 of the idler shaft 16. Therefore, rotation will be imparted to the output shaft 18 through the idler shaft 16 independently of which gear 28, 36 of the input shaft 14 is actually being utilized. Whenever one of the input gears 28, 36 is coupled to the input shaft 14 through the shift mechanism 44, the other input gear 36, 28 is capable of independent relative rotation the input shaft 14 as it is being driven under a no-load condition by its respective idling gear 70, 68 of the idler shaft 16.

As seen in FIG. 3, the forward output shaft 20 is not actually coupled for rotation with the rearward output shaft 18. The shaft 20 is mounted at its forward end at bearings 78 and is sleeved at its rearward end 80 to closely encircle and rotate about a forwardly extending portion 82 of the rearward output shaft 18. The sleeve 80 includes rearwardly extending dog lugs 84 thereon which are adapted to engage the matching lugs 85 of a dog clutch 86 when power is to be sent to both of the output shafts 18, 20. The dog clutch 86 includes an internally toothed central hole 88 which is slidably mounted on an externally toothed portion 89 of the rearward output shaft 18. As a result, coupling between the output shaft 18 and the output shaft 20 can be accomplished by selective movement of the dog clutch 86 axially in a forward direction to cause the lugs 85 to make engaging contact with the dog lugs 84 of the forward output shaft 20.

As thus explained, the preferred transfer case 10, when installed in a vehicle, provides for selective high or low speed operation of the rearward output shaft 18 which is coupled at 90 to a drive shaft of the rear axle configuration (not shown) or of both the rearward output shaft 18 and the forward output shaft 20 which is coupled at 91 to a drive axle of for the forward axle configuration (not shown). However, it is appropriate to discuss other features of the preferred transfer case 10 which are needed for its proper operation prior to a detailed discussion of the means employed for selecting high or low speed operation and the means employed for coupling and uncoupling the forward output shaft 20.

Basic lubrication for the transfer case 10 is provided by a supply of lubricating oil in an oil sump 92 in the lower region of the housing 12. The oil is generally transmitted to the working elements and the mounting bearings mentioned hereinabove through splash lubrication. An oil fill hole 93 in the forward wall 94 is utilized to provide the lubricating oil at a predetermined level piro to operation of the transfer case 10. A drain port 96 is provided to drain the oil from the oil sump 92 when so desired. Associated with each of the bearings 24, 78 and 74 at the walls of the housing 12 are oil seals 97 which encircle the shafts to generally retain lubricating oil in the bearing region. The bearings 26, 64, 66 and 72 are actually located within the housing 12 and therefore do not require oil seals of this type for their proper operation.

Because of the location of the input shaft 14 at the upper region of the housing 12 and because of the relative motions which are capable of existing during normal operation between the low speed gear 28, the shift mechanism 44, the high speed gear 36 and the input shaft 14, additional means for lubricating these elements is provided in the preferred transfer case 10 by an oil pump 98 at the rearward end 100 of the input shaft 14. The lubricating pump 98 takes a suction on a supply line 102 which runs along a rearward wall 104 of the transfer case 10 to receive oil from the oil sump 92 through a filter at a fitting 106 at the base of the housing 12. A detailed operation and explanation of the oil pump 98 will be provided hereinbelow. A speedometer device 108 is also provided on the rearward wall 104 and is of the worm gear type and directly measures the speed of the idling gear 16. A parking brake 110 (shown in phantom in FIGS. 2 and 3) is associated with the coupling 90 of the rearward output shaft 18 and is operated in a manner well known in the prior art.

Figure 4:
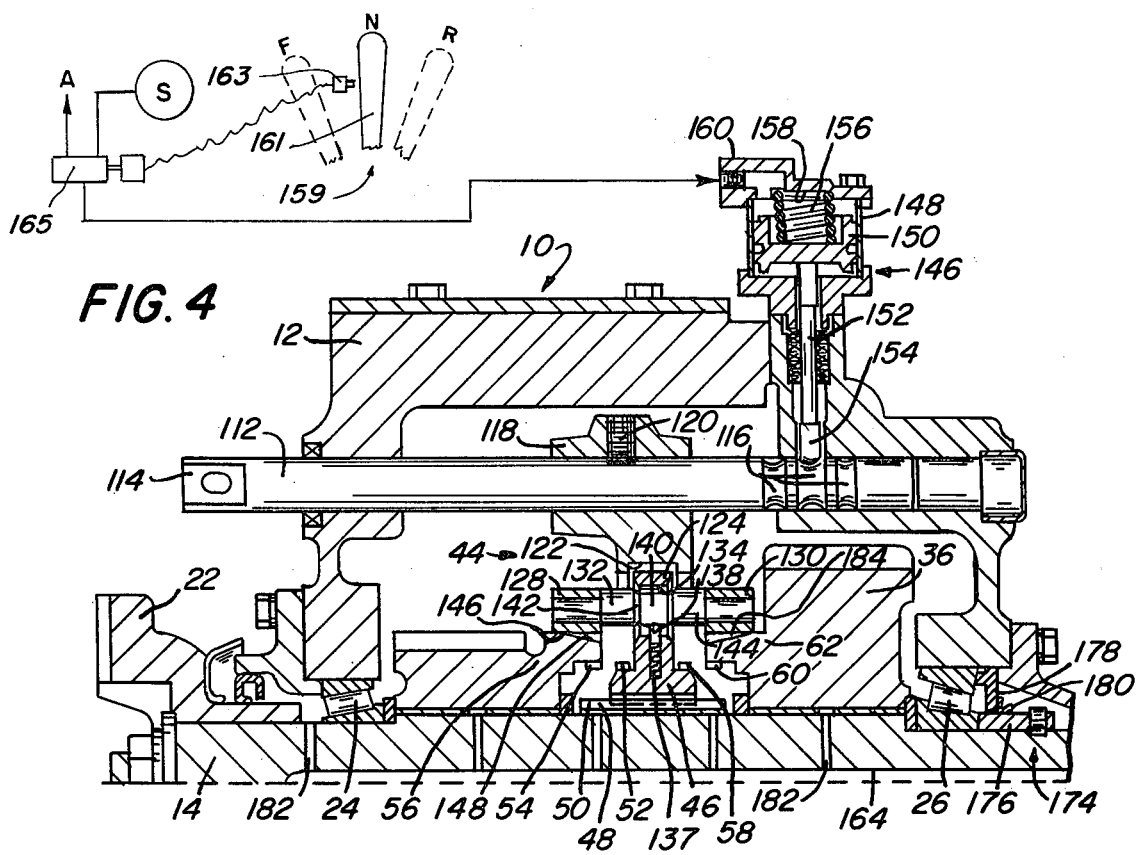
FIG. 4 is a view as seen along line 4—4 of FIG. 1 and includes a schematic view of the preferred vehicle control system.

As seen in FIG. 4 the shift mechanism 44 is basically operated to selectively provide either high speed or low speed operation through the axial positioning of a shift rod 112. Linkage (not shown) is coupled to the forward end 114 of the shift rod 112 which is basically designed to be positioned in one of three positions relative to the housing 12. Although, as will be explained in detail hereinbelow, three circumferential grooves 116 are provided at the rearward end of the shift rod 112 to be capable of acting in cooperation with a spring-loaded ball device in the prior art, it is sufficient at this time to understand that the shift rod 112 can be selectively moved between these three positions in the preferred transfer case 10 when shifting in and out of high and low speed is proper and desired. The present invention has replaced the basic spring-loaded ball device in the prior art which only served to urge the shift rod 112 into the desired axial position but did nothing to prevent shifting of the gears under a power condition which might damage the gears.

As shown in FIG. 4 the shift mechanism 44 is in the neutral position with neither the low speed gear 28 nor the high speed gear 36 being coupled to the input shaft 14. The clutch collar 46 is centrally located on the extending teeth 50 of the input shaft 14. The position of the clutch collar 46 is determined by the position of a fork 118 which is in turn determined by the position of the shift rod 112 to which the fork 118 is rigidly keyed at 120. The fork 118 includes an internal groove 122 which partially encircles the outer cylindrical periphery 124 of the clutch collar 46.

However, for the shift mechanism 44 to properly function to select either high or low speed operation, it is not sufficient for there to be simply provided linkage and gearing to properly couple the elements in a manner which will transmit torque. It is also essential to provide means to insure that the elements to be coupled will be rotating at the same relative speed in order for the matching gears to mesh. This is accomplished in the preferred transfer case 10 by the incorporation of clutch collar 46 within a synchronizer 126. The synchronizer 126 includes a pair of synchronizer rings 128, 130 which are respectively associated with the rearwardly extending cylindrical projection 56 of the low speed gear 28 and the forwardly extending cylindrical projection 62 of the high speed gear 36. The synchronizer rings are made of brass and are axially separated but joined one to the other in the preferred synchronizer 126 by six evenly distributed pins 132 extending therebetween. Six evenly spaced holes 134 around the clutch collar 46 are adapted to receive the pins 132 therethrough so that during operation of the synchronizer 126 and the clutch collar 46 the entire assembly will rotate with the input shaft 14. Accordingly, as explained hereinabove, as the clutch collar 46 is moved axially to provide the desired selective high or low speed operation, the clutch collar 46 is required to slide axially along each pin 132.

The clutch collar 46, however, is not free to slide unrestricted relative to the pins 136 because of two features which are incorporated into the synchronizer 126. The first feature includes a plunger and spring 137 which is provided within the interior of the clutch collar 46 at each hole 134 therethrough. The plunger is adapted to be received within a detent 138 which is in the interior surface of each pin 132 in an axially central location thereon. Therefore, the plunger and spring 137 will be received within the detent 138 when the clutch collar 146 is in the neutral position, as shown in FIG. 4, so that this relative axial position will be maintained until a positive force is provided by the fork 118 to otherwise position the clutch collar 46. Secondly, each pin 132 is provided a circumferential groove 140 in the central location thereon so that each hole 134 in the clutch collar 46 will be positioned within the circumferential groove 140 when the clutch collar 46 is in the neutral position. The circumferential groove 140 is provided an inclined surface 142 at each end thereof which terminates at the outer cylindrical surface 144 at each end of the pin 132. Accordingly, while the interior dimensions of the hole 134 in the clutch collar 46 is capable of receiving the cylindrical surface 144 therein, when the clutch collar 46 is in the neutral position, the hole 134 must be properly aligned within the groove 140 before the cylindrical surface 144 can be received therein. In other words, if the hole 134 is not properly aligned with the cylindrical surface 144, the appropriate inclined surface 142 will act upon the edge of the hole 134 (with the application of sufficient axial force being provided to the clutch collar 46) to rotate the clutch collar 46 relative to the pins 132 until proper alignment is accomplished.

During operation in the neutral position as shown in FIG. 4, each synchronizer ring 128, 130 is free to rotate relative to the respective cylindrical projection 56, 62. However, each synchronizer ring 128, 130 is provided an interior frustoconical surface 146 which is adapted to make sliding contact with a matching frustoconical surface 148 on its respective cylindrical projection 56, 62. Accordingly, the surfaces 146, 148 are capable of making sliding contact but the application of axial force on the synchronizing ring 128, 130 will increase the frictional contact between the surfaces 146, 148 until the synchronizing ring 128, 130 rotates at the same relative speed as its respective cylindrical projection 56, 62.

To fully understand the operation of the shift mechanism 44 and the clutch collar 46 as thus explained, it is perhaps best to give an example of a typical gear shifting operation. Assuming the shift mechanism 44 is in a position for low speed operation, the clutch collar 46 is axially positioned forward so that the teeth 52, 54 are engaged at the input shaft 14, clutch collar 46, synchronizer 126 and the low speed gear 28 are all rotating at the same speed. Further, assuming that the proper engine and transmission conditions are met so that the transfer case 10 can be shifted to high speed operation, the associated linkage will be operated to move the shift rod 112 axially, rearwardly. Although they will be explained hereinabove, it is better at this time to disregard any restrictive forces that might act on the grooves 116 of the shift rod 112. Accordingly, the shift rod 112 will move axially rearwardly to cause the fork 118 to operate on the clutch collar 46 to disengage the teeth 52, 54 as the clutch collar 46 slides along the rods 132. When the neutral position is obtained, the plunger and spring 137 will be seated in the detent 138 at each rod 132 to center the clutch collar 46 thereon in a position within the circumferential groove 140 of each rod 132.

In an effort to shift to high speed operation, continued force in an axially rearward direction will cause the fork 118 to act on the clutch collar 46. However, the clutch collar 46 is not free to move rearwardly, since it is now positioned within the circumferential groove 140 of each pin 132, without making interfering contact with the inclined surface 142. The interfering contact with the inclined surface 142 causes the clutch collar 46 to apply an axially rearwardly directed force to the synchronizer 126 to bring the surfaces 146, 148 of the synchronizing ring 130 and the cylindrical extension 62 into increasing sliding contact. If, as expected, the high speed gear 36 would be rotating at a relatively lower speed than the aforementioned elements, the contact between the surfaces 146, 148 would produce a braking force on the synchronizer 126. However, since the clutch collar 46 is directly coupled to the input shaft 14 there is continuing contact between the clutch collar 46 and the inclined surfaces 142 which prevents proper alignment of the holes 134 in the clutch collar 46 with the cylindrical surface 144 of each pin 132. This interfering contact between the clutch collar 46 and the inclined surface 142 will continue until the relative speed of the synchronizing ring 130 and the cylindrical projection 62 (and thus the high speed gear 36) are almost identical. As a result, the input shaft 14 would be caused to rotate at the same speed as the high speed gear 36. Once the input shaft 14 and the high speed gear 36 are rotating at the same speed, continued force by the fork 118 on the clutch collar 46 will cause the clutch collar 46 to make sliding contact with the inclined surface 42 causing it to be aligned with the cylindrical surface 144 of the pin 132 at the rear end thereof. Once this alignment is obtained, the clutch collar 46 can move axially rearwardly and the teeth 58, 60 are properly aligned for engagement.

It should be clear that a similar operation will result if it is desirable to shift from the high speed operation to the low speed operation as the synchronizer 126 again insures that the speeds are properly matched and that the gears can be properly aligned for engagement. It should also be clear that the shift mechanism 44 would operate in a similar manner even if the clutch collar 46 were initially located in a neutral position and either high or low speed operation was desired.

However, it can be seen that free axial movement of the shift rod 112 when the input shaft 14 is operating in a power mode might cause damage to the synchronizer 126 and/or gear teeth 52, 54, 58 or 60. Although the synchronizer 126 should prevent contact between the teeth until the speeds are matched, if the input shaft 14 is being operated under a power mode, the synchronizing rings 128, 130 would be required to drive their respective gears up to the speed of the input shaft 14. Rapid changes in power or torque might damage the synchronizer 120 or otherwise prevent it from functioning properly.

As mentioned hereinabove, the grooves 116 have been employed in the prior art to also create forces on the shift rod 112 to affect its position during shifting. A spring-loaded ball detent configuration was utilized for this purpose in the prior art and generally established "preferred" axial positioning of the rod during shifting operation. In the preferred transfer case 10, an interlock device 146 satisfies this function and includes other features which are desirable for proper transfer case operation.

The preferred interlock device 146 inclues a means for preventing any selective axial positioning of the shift rod 112 from one position to another if there is the possibility of any torque being transmitted to the transfer case which might interfere with the shifting operation. The interlock device 146 includes a power cylinder 148 which is mounted to the housing 112 in general alignment with the portion of the shift rod 112 which includes the circumferential grooves 116. Disposed within the power cylinder 148 is a piston 150 and a piston rod 152 which terminate at a rod position locating device 154 which replaces the ball element in the prior art spring-loaded ball detent configuration. During normal opration, a spring 156 within the power cylinder 148 is in a compressed state between the piston 150 and the interior end wall 158 of the cylinder to provide biasing to the position locating device 154. Accordingly, the position locating device 154 is biased toward the exterior surface of the shift rod 112 to resist selective axial positioning of the shift rod 112 from one circumferential groove 116 to another during normal operation. In the preferred interlock device 146, normal selective operation can only occur if the basic transmission for the vehicle is placed in neutral so that no torque can be transmitted from the vehicle motor through the transmission to the transfer case 10 during shifting operation.

Accordingly, the preferred interlock device 146 utilizes a vehicle control system 159 having a supply of pressurized air at an inlet 160 to create a force on the piston 150 whenever the vehicle transmission is in any condition other than in neutral. The preferred vehicle control system 159 is shown schematically in FIG. 4 to also include a gear-shift lever 161 for the main transmission, a position sensor 163 and a solenoid-operated three-way valve 165 in the associated piping for the interlock device 146. Specifically, when the gearshift lever 161 is in neutral N, the position sensor 163 provides a signal to operate the solenoid of the three-way valve 165 to cause the interlock device 146 to be vented to atmosphere A. When the gearshift lever 161 is in any of the forward positions F or reverse positions R to cause the main transmission to be in a power mode, the absence of a signal from the position sensor 163 removes power to the solenoid and allows the three-way valve to be repositioned by springs to cause the supply of pressurized air S to be directed to the inlet 160. When the vehicle is in a power mode, the pressurized air is designed to create a sufficient force on the piston 150, the rod 152 and the position locating device 154 to cause the position locating device 154 to be firmly retained within the appropriate circumferential groove 116. Any effort to shift the transfer case 110 during this power mode would be so resistred by insertion of the position locating device 154 within the groove 116 that axial repositioning of the shift rod 112 would be prevented. Therefore, during normal operation, with the gearshift lever 161 in neutral N the shift rod 112 can be positioned at any selected axial positioning against the resistance created by the biasing of spring 156 and will generally be retained in the selected position as the position locating device 154 is fully seated in the appropriate circumferential groove 116. However, once power is again applied to the transfer case 10 at the input shaft 14 as the transmission is taken out of the neutral mode, this condition is sensed in the preferred vehicular control system 159 or in any alternative such manner well known in the prior art and a control signal is transmitted to supply the pressurized air to the inlet 160 to thus prevent any further axial positioning of the shift rod 112. Once the transmission is returned to a neutral mode, the system would sense this condition and relieve the pressurized air from the power cylinder 146 to allow the transfer case 10 to be returned to a condition which would allow normal shifting operation.

As mentioned hereinabove, the location of the input shaft 14 at the upper region of the housing 12 and the relative motions which exist between the low speed gear 28, the shift mechanism 44, the high speed gear 36 and the input shaft 14 make it desirable that additional means for lubrication be provided by the oil pump 98. The oil pump 98 can be either a vane or gear type of lubricating pump well known in the prior art but the but the gear type has been specifically employed in the operation of the preferred transfer case 10. As seen in FIG. 3, the pump 98 includes a drive shaft 162 which includes a keyed extension 164 directed toward the input shaft 14. The input shaft 14 includes an axial bore 164 and has at its rearward end an internal splined region 166. A hollow plug 168 with a central bore extending axially therethrough is adapted to be rigidly received within the internal splined region 166. The plug 168 has a slot in the surface of the end thereof which receives the keyed extension 164 to effectively couple the input shaft 14 and the drive shaft 162 of the pump 98. Accordingly, the pump 98 will be caused to operate during any rotational movement of the input shaft 14 and is thus capable of providing lubrication to the various elements associated with the input shaft 14.

During rotation of the input shaft 14, the oil pump 98 takes a suction on the supply line 102 and discharges lubricating oil under pressure at an outlet 170. The outlet 170 communicates with the interior of an extended portion 172 of the housing 12 which encircles the rearward end 100 of the input shaft 14. The interior of the extended portion 172 is basically sealed for lubricating purposes by the inclusion on the rearward end 100 of the input shaft 14 of a sealing device 174 (best seen in FIG. 4). The sealing device 174 includes a collar 176 which encircles the rearward 100 of the input shaft 14 and is keyed thereto. A ring 178 is firmly secured between the bearing 26 and the extended portion 172 to closely encircle the collar 176. A seal 180 is mounted on the collar 176 to make sliding, sealed contact with the ring 178 to effectively retain the lubricating oil under pressure within the interior of the extended portion 172 by effectively preventing any significant leakage around the exterior of the input shaft 14 to the region of the bearing 26 and the full interior of the housing 12.

Accordingly, the oil pressure is allowed to build up within the interior of the extended portion 172 and the lubricating oil is forced to flow through the central hole in the hollow plus 168 and into the bore 164 in the interior of the input shaft 14. A plurality of radially extending ports 182 extend from the bore 164 and provide lubrication to the various elements associated with the input shaft 14. Specifically, it can be seen that lubricating fluid provided within the interior of the synchronizer 126 will insure that its proper operation will not be interrupted by lack of lubrication. Because of the significant friction which is generated between the surfaces 146 and 148, as discussed hereinabove, a plurality of axially extending lubricating grooves 184 is provided for each synchronizing ring 128, 130.

To insure that the pressure of the lubricating oil does not exceed a desired operating pressure at the various elements associated with the input shaft 14, a relief valve 186 communicates with the interior of the extended portion 172 through a line 188 and is capable of discharging lubricating oil through a discharge line 190. If the pressure exceeds the design pressure, the lubricating oil will then be discharged through the discharge line 190 to the interior of the housing 12 to effectively maintain the oil pressure within the extended portion at the desired operating level.

Figure 5:
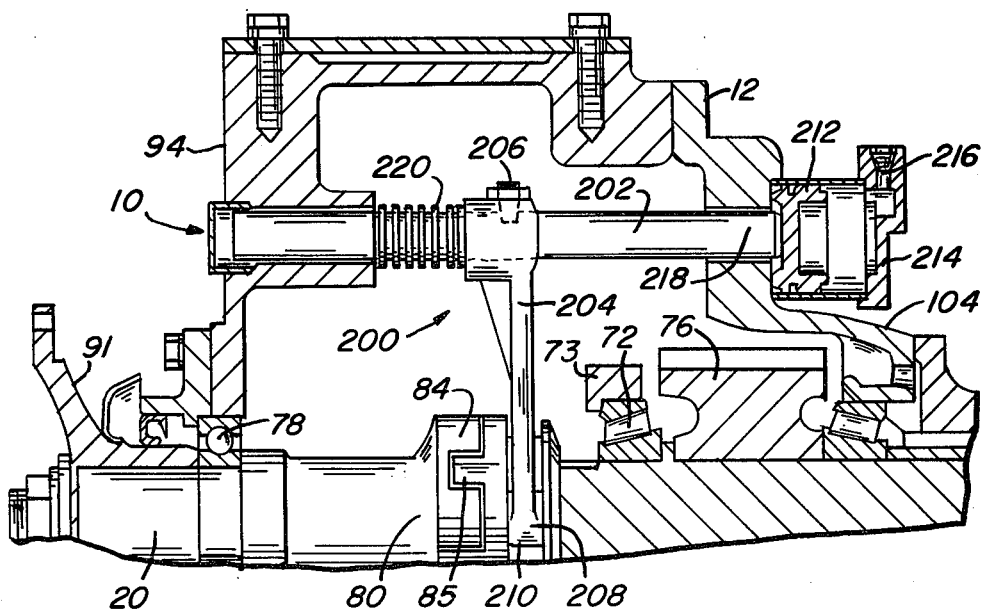
FIG. 5 is a view as seen along line 5—5 of FIG. 1.

As seen in FIG. 5, a transfer mechanism 200 of the preferred transfer case 10 includes a transfer rod 202 which is mounted for axial movement within the housing 12. A fork 204 is rigidly mounted on the transfer rod 200 and keyed at 206 thereto. The extended end 208 of the fork 204 is received within a circumferential groove 210 of the dog clutch 86 so that movement of the transfer rod 202 will produce a corresponding axial movement of the dog clutch 86. As seen in FIG. 5, the dog clutch 86 is shifted to a forward position to couple the output shaft 18 and the output shaft 20 so that the output of the transfer case 10 will be provided to both output shafts 18, 20.

The transfer rod 202 is shifted forwardly for the desired coupling by the action of a piston 212 within a power cylinder 214 which is mounted on the rearward wall 104 of the housing 12. Pressurized air is provided at the inlet 216 of the power cylinder 214 to force the piston 212 against the rearward end 218 of the shift rod 202. A spring 220 which is mounted in a compressed state between the forward wall 94 of the housing 12 and the fork 204 provides biasing to the transfer rod 202 in a rearward direction which will normally uncouple the output shafts 18, 20 unless the piston 212 is caused to forwardly move the transfer rod 202 for the purpose of coupling the shafts. Therefore, when in the operation of the transfer case 10 it is desired to uncouple the shafts 18, 20 the pressurized air in the power cylinder 214 is released so that the spring 220 can shift the transfer rod 202 rearwardly.

As thus described, the preferred transfer case 10 can safely and reliably provide high or low speed operation in conjunction with a conventional transmission as the present invention prevents the vehicle operator from shifting operations which might otherwise damage the transfer case.

We claim:

1. An interlock device for a shift mechanism of multi-speed power transmission device which receives an input from a torque transmitting power source which power source can be selectively operated in a power mode or a neutral mode, said multi-speed power transmission device being capable of operation in specific gear ratio operating conditions or a neutral non-operating condition, said interlock device comprising:

said shift rod being mounted within a housing of said multi-speed power transmission device and capable of selective axial positioning therein at a plurality of predetermined locations each of which is associated with one of said specific gear ratio operating conditions and said neutral non-operating condition;

means for preventing said selective axial positioning of said shift rod from one of said predetermined locations to another of said predetermined locations when said torque power transmitting source is being operated in said power mode;

said means for preventing said selective axial positioning of said shift rod including a position locating device mounted relative to said housing for movement radially toward and away from said shift rod, said shift rod having a plurality of axially separated detents along the exterior surface thereof which are respectively aligned with said position locating device when said shift rod is positioned at said plurality of predetermined locations, and means for applying a predetermined force to said position locating device towards said shift rod to cause it to engage said detents associated with said one predetermined location when said torque transmitting power source is being operated in said power mode to prevent axial movement of said shift rod to said another predetermined location; and said means for applying said predetermined force including a power cylinder mounted relative to said housing with a piston and a piston rod thereof being aligned with said position locating device to be capable of transmitting said predetermined force thereto and means for applying fluid pressure to said piston to generate said predetermined force when said torque transmitting power source is being operated in said power mode and for relieving said fluid pressure from said power cylinder when said torque transmitting power source is being operated in said neutral mode.

2. The interlock device as set forth in claim 1, wherein said fluid pressure is provided by pressurized air.

3. The interlock device as set forth in claim 1, wherein said position locating device is an extended portion of said piston rod.

4. The interlock device as set forth in claim 1, further including means for biasing said position locating device toward said exterior surface of said shift rod to resist selective axial positioning of said shift rod from said one predetermined location to said another predetermined location when said torque transmitting power source is being operated in said neutral mode.

5. The interlock device as set forth in claim 4, wherein said biasing means includes a spring within said cylinder which is under compression between said piston and the interior end wall of said cylinder to transmit compressive force to said piston locating device.

* * * * *